United States Patent
Allam et al.

(10) Patent No.: US 10,711,695 B2
(45) Date of Patent: *Jul. 14, 2020

(54) METHOD AND SYSTEM FOR POWER PRODUCTION WITH IMPROVED EFFICIENCY

(71) Applicant: 8 Rivers Capital, LLC, Durham, NC (US)

(72) Inventors: Rodney John Allam, Chippenham (GB); Brock Alan Forrest, Durham, NC (US); Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/814,885

(22) Filed: Nov. 16, 2017

(65) Prior Publication Data

US 2018/0073434 A1 Mar. 15, 2018

Related U.S. Application Data

(63) Continuation of application No. 14/792,728, filed on Jul. 7, 2015, now Pat. No. 9,850,815.

(Continued)

(51) Int. Cl.
*F02C 7/10* (2006.01)
*F02C 3/34* (2006.01)
(Continued)

(52) U.S. Cl.
CPC .............. *F02C 7/10* (2013.01); *F02C 3/04* (2013.01); *F02C 3/34* (2013.01); *F02C 7/143* (2013.01); *F25J 3/04018* (2013.01); *F25J 3/04533* (2013.01); *F25J 3/04618* (2013.01); *F05D 2220/32* (2013.01); *F05D 2240/35* (2013.01);
(Continued)

(58) Field of Classification Search
CPC .... F02C 7/10; F02C 7/143; F02C 3/04; F02C 3/34; F05D 2260/213
See application file for complete search history.

(56) References Cited

U.S. PATENT DOCUMENTS 3,369,361 A 2/1968 Craig
3,376,706 A 4/1968 Angelino
(Continued)

FOREIGN PATENT DOCUMENTS

| JP | 2225905 | 9/1990 |
| JP | 2001-132472 | 5/2001 |
| WO | WO 95/12757 | 5/1995 |

OTHER PUBLICATIONS

Bryant et al., "An Analysis and Comparison of the Simple and Recompression Supercritical CO2 Cycles," *Supercritical CO2 Power Cycle Symposium*, May 25, 2011. XP055218674, pp. 1-8.
(Continued)

*Primary Examiner* — Steven M Sutherland
(74) *Attorney, Agent, or Firm* — Womble Bond Dickinson (US) LLP (57) ABSTRACT

The present disclosure relates to systems and methods that provide power generation using predominantly $CO_2$ as a working fluid. In particular, the present disclosure provides for the use of a portion of the heat of compression from a $CO_2$ compressor as the additive heating necessary to increase the overall efficiency of a power production system and method.

14 Claims, 3 Drawing Sheets

Related U.S. Application Data (60) Provisional application No. 62/021,839, filed on Jul. 8, 2014.

(51) Int. Cl.
  *F25J 3/04* (2006.01)
  *F02C 3/04* (2006.01)
  *F02C 7/143* (2006.01)

(52) U.S. Cl.
  CPC .... *F05D 2260/213* (2013.01); *F05D 2270/20* (2013.01); *F25J 2230/06* (2013.01); *F25J 2240/70* (2013.01); *F25J 2260/80* (2013.01)

(56) References Cited

U.S. PATENT DOCUMENTS

| | | | |
|---|---|---|---|
| 3,503,208 A | 3/1970 | Schmidt | |
| 3,544,291 A | 12/1970 | Schlinger et al. | |
| 3,736,745 A | 6/1973 | Karig | |
| 3,754,406 A | 8/1973 | Allam | |
| 3,796,045 A | 3/1974 | Foster-Pegg | |
| 3,837,788 A | 9/1974 | Craig et al. | |
| 3,868,817 A | 3/1975 | Marion et al. | |
| 3,971,211 A | 7/1976 | Wethe et al. | |
| 3,976,443 A | 8/1976 | Paull et al. | |
| 4,132,065 A | 1/1979 | McGann | |
| 4,154,581 A | 5/1979 | Nack et al. | |
| 4,191,500 A | 3/1980 | Oberg et al. | |
| 4,193,259 A | 3/1980 | Muenger et al. | |
| 4,206,610 A | 6/1980 | Santhanam | |
| 4,498,289 A | 2/1985 | Osgerby | |
| 4,522,628 A | 6/1985 | Savins | |
| 4,602,483 A | 7/1986 | Wilks et al. | |
| 4,702,747 A | 10/1987 | Meyer et al. | |
| 4,721,420 A | 1/1988 | Santhanam et al. | |
| 4,765,143 A | 8/1988 | Crawford et al. | |
| 4,765,781 A | 8/1988 | Wilks et al. | |
| 4,839,030 A | 6/1989 | Comolli et al. | |
| 4,852,996 A | 8/1989 | Knop et al. | |
| 4,881,366 A | 11/1989 | Nurse | |
| 4,957,515 A | 9/1990 | Hegarty | |
| 4,999,992 A | 3/1991 | Nurse | |
| 4,999,995 A | 3/1991 | Nurse | |
| 5,175,995 A | 1/1993 | Pak et al. | |
| 5,247,791 A | 9/1993 | Pak et al. | |
| 5,265,410 A | 11/1993 | Hisatome | |
| 5,345,756 A | 9/1994 | Jahnke et al. | |
| 5,353,721 A | 10/1994 | Mansour et al. | |
| 5,394,686 A | 3/1995 | Child et al. | |
| 5,415,673 A | 5/1995 | Hilton et al. | |
| 5,421,166 A | 6/1995 | Allam et al. | |
| 5,507,141 A | 4/1996 | Stigsson | |
| 5,520,894 A | 5/1996 | Heesink et al. | |
| 5,590,519 A | 1/1997 | Almlöf et al. | |
| 5,595,059 A | 1/1997 | Huber et al. | |
| 5,692,890 A | 12/1997 | Graville | |
| 5,709,077 A | 1/1998 | Beichel | |
| 5,715,673 A | 2/1998 | Beichel | |
| 5,724,805 A | 3/1998 | Golomb et al. | |
| 5,802,840 A | 9/1998 | Wolf | |
| 5,906,806 A | 5/1999 | Clark | |
| 5,937,652 A | 8/1999 | Abdelmalek | |
| 6,024,029 A | 2/2000 | Clark | |
| 6,148,602 A | 11/2000 | Demetri | |
| 6,170,264 B1 | 1/2001 | Viteri et al. | |
| 6,196,000 B1 | 3/2001 | Fassbender | |
| 6,199,364 B1 | 3/2001 | Kendall et al. | |
| 6,202,574 B1 | 3/2001 | Liljedahl et al. | |
| 6,209,307 B1 | 4/2001 | Hartman | |
| 6,260,348 B1 | 7/2001 | Sugishita et al. | |
| 6,263,661 B1 | 7/2001 | Van der Burgt et al. | |
| 6,269,624 B1 | 8/2001 | Frutschi et al. | |
| 6,289,666 B1 | 9/2001 | Ginter | |
| 6,298,664 B1 | 10/2001 | Åsen et al. | |
| 6,333,015 B1 | 12/2001 | Lewis | |
| 6,389,814 B2 | 5/2002 | Viteri et al. |
| 6,430,916 B2 | 8/2002 | Sugishita et al. |
| 6,532,745 B1 | 3/2003 | Neary |
| 6,536,205 B2 | 3/2003 | Sugishita et al. |
| 6,543,214 B2 | 4/2003 | Sasaki et al. |
| 6,550,234 B2 | 4/2003 | Guillard |
| 6,598,398 B2 | 7/2003 | Viteri et al. |
| 6,612,113 B2 | 9/2003 | Guillard |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,820,689 B2 | 11/2004 | Sarada |
| 6,824,710 B2 | 11/2004 | Viteri et al. |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,945,052 B2 | 9/2005 | Frutschi et al. |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,089,743 B2 | 8/2006 | Frutschi et al. |
| 7,111,463 B2 | 9/2006 | Sprouse et al. |
| 7,124,589 B2 | 10/2006 | Neary |
| 7,147,461 B2 | 12/2006 | Neary |
| 7,191,587 B2 | 3/2007 | Marin et al. |
| 7,192,569 B2 | 3/2007 | Stewart |
| 7,281,590 B2 | 10/2007 | Van de Waal |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,631 B2 | 2/2008 | Kato et al. |
| 7,360,639 B2 | 4/2008 | Sprouse et al. |
| 7,363,764 B2 | 4/2008 | Griffin et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,516,607 B2 | 4/2009 | Farhangi et al. |
| 7,516,609 B2 | 4/2009 | Agnew |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,665,291 B2 | 2/2010 | Anand et al. |
| 7,717,046 B2 | 5/2010 | Sprouse et al. |
| 7,722,690 B2 | 5/2010 | Shires et al. |
| 7,731,783 B2 | 6/2010 | Sprouse et al. |
| 7,739,874 B2 | 6/2010 | Nigro |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,827,797 B2 | 11/2010 | Pronske et al. |
| 7,874,140 B2 | 1/2011 | Fan et al. |
| 7,882,692 B2 | 2/2011 | Pronske et al. |
| 7,927,574 B2 | 4/2011 | Stewart |
| 7,934,383 B2 | 5/2011 | Gutierrez et al. |
| 7,950,243 B2 | 5/2011 | Gurin |
| 8,043,588 B2 | 10/2011 | Hustad et al. |
| 8,088,196 B2 | 1/2012 | White et al. |
| 8,109,095 B2 | 2/2012 | Henriksen et al. |
| 8,220,248 B2 | 7/2012 | Wijmans et al. |
| 8,596,075 B2 | 12/2013 | Allam et al. |
| 8,776,532 B2 | 7/2014 | Allam et al. |
| 8,986,002 B2 | 3/2015 | Palmer et al. |

(56) References Cited

U.S. PATENT DOCUMENTS

| | | |
|---|---|---|
| 9,068,743 B2 | 6/2015 | Palmer et al. |
| 2002/0134085 A1 | 9/2002 | Frutschi |
| 2003/0131582 A1 | 7/2003 | Anderson et al. |
| 2003/0221409 A1 | 12/2003 | McGowan |
| 2004/0011057 A1 | 1/2004 | Huber |
| 2004/0123601 A1 | 7/2004 | Fan |
| 2004/0134197 A1 | 7/2004 | Marin et al. |
| 2005/0126156 A1 | 6/2005 | Anderson et al. |
| 2006/0242907 A1 | 11/2006 | Sprouse et al. |
| 2007/0180768 A1 | 8/2007 | Briesch et al. |
| 2007/0274876 A1 | 11/2007 | Chiu et al. |
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0229271 A1 | 9/2009 | Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0300063 A1 | 12/2010 | Palmer et al. |
| 2011/0036011 A1 | 2/2011 | Sprouse et al. |
| 2011/0127773 A1 | 6/2011 | Freund et al. |
| 2011/0179799 A1 | 7/2011 | Allam et al. |
| 2011/0233940 A1 | 9/2011 | Aoyama et al. |
| 2011/0239651 A1 | 10/2011 | Aoyama et al. |
| 2012/0067054 A1 | 3/2012 | Palmer et al. |
| 2012/0067056 A1 | 3/2012 | Palmer et al. |
| 2012/0073261 A1 | 3/2012 | Palmer et al. |
| 2012/0237881 A1 | 9/2012 | Allam et al. |
| 2013/0104525 A1 | 5/2013 | Allam et al. |
| 2013/0118145 A1 | 5/2013 | Palmer et al. |
| 2013/0205746 A1 | 8/2013 | Allam et al. |

OTHER PUBLICATIONS

Hong et al., "Analysis of Oxy-Fuel Combustion Power Cycle Utilizing a Pressurized Coal Combustor,"*Energy*, Available Online Jun. 21, 2009, pp. 1332-1340, vol. 34, No. 9.

(IAEA) Moisseytsev et al., "Supercritical Carbon Dioxide Brayton Cycle for SFR Applications: Optimization, Transient Analysis, and Control," *IAEA International Atomic Energy Agency, Proceedings of an International Conference: Fast Reactors and Related Fuel Cycles: Challenges and Opportunities FR13*, Paris, France, Mar. 4, 12013, XP040574212, pp. 1-10.

E.I. Yantovskii et al., "Computer Exergonomics of Power Plants Without Exhaust Gases," Energy Convers. Mgmt., Publ. 1992, vol. 33, No. 5-8, pp. 405-412.

METHOD AND SYSTEM FOR POWER PRODUCTION WITH IMPROVED EFFICIENCY

CROSS-REFERENCE TO RELATED APPLICATIONS

The present application is a continuation of U.S. application Ser. No. 14/792,728, filed Jul. 7, 2015, which claims priority to U.S. Provisional Patent Application No. 62/021,839, filed Jul. 8, 2014, the disclosures of which are incorporated herein by reference in their entirety.

FIELD OF THE DISCLOSURE

The presently disclosed subject matter relates to systems and methods for generation of power, such as electricity, that operate at desirable efficiencies that are achieved through additive heating of at least part of a recycle $CO_2$ stream in a heat exchanger using a further heat source. Particularly, heat from the further source can be derived at least in part from compression of at least a portion of the recycle $CO_2$ stream.

BACKGROUND

Conventional means of power production from combustion of a fuel typically lack the ability to simultaneously achieve high efficiency power generation and carbon capture (e.g., for sequestration or other use). One publication in the field of high efficiency power generation with carbon capture, U.S. Pat. No. 8,596,075 to Allam et al., provides for desirable efficiencies in closed cycle combustion systems using $CO_2$ as the working fluid. Such systems in particular benefit from the recognized usefulness of heating a recycle $CO_2$ stream in a recuperative heat exchanger using heat from the hot turbine exhaust as well as adding further heat from a source other than the turbine exhaust. Despite such advances, there is yet a growing need in the art for improved systems and methods for power generation that provide increased efficiency with capture of $CO_2$ and other fuel and combustion derived impurities.

SUMMARY OF THE DISCLOSURE

The present disclosure provides systems and methods of power production with improved efficiency. The systems and methods can utilize $CO_2$ as a working fluid and can be configured for capture of $CO_2$ and other fuel and combustion derived impurities. The present improvements have been identified in relation to the introduction of low temperature level heating to a recycle $CO_2$ stream in an elevated pressure, oxy-fuel combustion system and method that also utilizes recuperative heating of the recycle $CO_2$ stream with heat from the hot turbine exhaust. The low temperature level heating can be described herein in terms of being "additive heating." As such, it is understood that the additive heating is low temperature level heat from a source other than the hot turbine exhaust. In other words, the additive heating is not heat that is recuperated from the hot turbine exhaust. The present disclosure in particular identifies means for obtaining and transferring the additive heating in a closed cycle or partially closed cycle oxy-fuel combustion system and method that provides a power production output that exceeds the heating capacity of the heat from the fuel alone and thus provides an advantageous increase in efficiency.

In some embodiments, the present disclosure relates to systems and methods for generation of power, such as electricity, that operate at desirable efficiencies that are achieved through the combustion of a fuel (e.g., a carbonaceous or carbonaceous fuel) in oxygen at elevated pressure in the presence of a recycle $CO_2$ stream followed by expansion of the product gas through a power producing turbine and cooling of the turbine exhaust in a recuperative heat exchanger, which heats the previously compressed recycle $CO_2$ stream. Improved efficiency of power generation can be obtained by additive heating of at least part of the recycle $CO_2$ stream in a heat exchanger using additive heating, which can be, for example, heat derived at least in part from compression of at least a portion of the recycle $CO_2$ stream.

In various embodiments, power production can be achieved utilizing a closed cycle or partially closed cycle system in which $CO_2$ is utilized as the working fluid. In such systems, a fossil fuel (e.g., natural gas) or a fuel derived from a fossil fuel (e.g., syngas derived from coal or other solid carbonaceous fuel) is completely combusted in a combustor using substantially pure oxygen as the oxidant to give an oxidized stream of predominantly $CO_2$, $H_2O$, excess $O_2$, and a quantity of impurities derived from oxidized components in the fuel or oxidant, such as $SO_2$, $NO_x$, Hg, and HCl. Solid fossil fuels, such as coal, lignite, or petroleum coke, that contain non-combustible ash may be converted to a gaseous fuel by partial oxidation in a single stage or multi-stage system. Such system, for example, may comprise a partial oxidation reactor. Alternatively, for example, such system may comprise a partial oxidation reactor and an ash and volatile inorganic component removal system. Such systems further comprise combustion of the fuel gas with oxygen in the combustor of the power production system. A preheated recycle $CO_2$ stream is mixed in the combustor with the combustion products derived from combustion of the fuel gas. Any combustor adapted for operation under conditions otherwise described herein may be used, and the recycle $CO_2$ stream may be introduced to the combustor by any means to be further heated by the combustion and, if desired, to quench and thereby control the temperature of the exit stream. In some embodiments, one or both of a POX reactor and the combustor may utilize, for purposes of example only, a transpiration cooled wall surrounding the reaction or combustion space, and the preheated recycle $CO_2$ stream may pass through the wall to both cool the wall and to quench and thereby control the temperature of the exit stream. The transpiration flow promotes good mixing between the recycle $CO_2$ and the hot combusted fuel gas streams. Other types of combustors, however, may also be used, and the present disclosure is not limited to the use of transpiration cooled combustors. Although certain fuel types are exemplified above, it is understood that other fuels (e.g., hydrogen) may be utilized in the combustor. Likewise, the advantages flowing from the use of additive heat may be applied to systems utilizing non-combustion heating in part or in total. For example, use of solar systems such as described in U.S. Pat. Pub. No. 2013/0118145, the disclosure of which is incorporated herein by reference, is also encompassed by the present disclosure.

The combined combustion products and preheated recycle $CO_2$ leaving the combustor are at the temperature required for the inlet to a power-producing turbine. The $CO_2$ power cycle can use a pressure ratio across the turbine from 5 to 12 in some embodiments, although greater pressure ratios (e.g. at least 20) may be used in other embodiments, such as when utilizing a plurality of expansion turbines. A turbine inlet pressure of about 100 bar (10 MPa) to about 500 bar (50 MPa) can be used in some embodiments. The oxygen supplied to the combustor can be either substantially pure $O_2$ or $O_2$ diluted with $CO_2$. In some embodiments, mixing of the $O_2$ and $CO_2$ can be useful to control the adiabatic flame temperature of the combustion reaction. As a non-limiting example, the molar concentration of $O_2$ in the combined $O_2/CO_2$ stream can be about 10% to about 50%, about 15% to about 40%, or about 20% to about 30%. The hot turbine exhaust can be cooled in an economizing heat exchanger, which in turn preheats the high pressure $CO_2$ recycle stream.

The efficient operation of the system is critically dependent on the optimization of the heat exchange. To achieve a high efficiency, a large quantity of additive heat can be added into the high pressure recycle stream at the cold end of the heat exchanger, such as at a temperature level from about 100° C. to about 400° C. This low temperature level heat may be derived in some embodiments from the air compressors of a cryogenic oxygen plant, which compressors may be operated wholly or in part with their pressure ranges in a high-pressure ratio adiabatic mode so that the compressed air is raised in temperature at the stage discharge to a point in the range of about 100° C. to about 400° C. and so that heat transfer from the compressed air stream to the pressurized recycle $CO_2$ process stream can be easily accomplished. For example, a side stream flow taken from the high pressure $CO_2$ recycle flow in the economizer heat exchanger can be heated against cooling compressed air to a required temperature of about 100° C. to about 400° C. Systems and methods for such oxyfuel combustion, low level heat production, and low level heat transfer are described in U.S. Pat. Nos. 8,596,075, 8,776,532, 8,986,002, 9,068,743, U.S. Pat. Pub. No. 2010/0300063, U.S. Pat. Pub. No. 2012/0067054, U.S. Pat. Pub. No. 2012/0237881, and U.S. Pat. Pub. No. 2013/0104525, the disclosures of which are incorporated herein by reference in their entireties.

The present disclosure provides further means for introducing heat into a recycle $CO_2$ high pressure stream at a temperature of about 100° C. to about 400° C. and thus increase the effectiveness of an economizer heat exchanger and increase the overall efficiency of the power production system and method incorporating the present heat transfer means. In particular, the present disclosure provides for the use of a portion of the heat of compression from a recycle $CO_2$ compressor as the additive heating necessary to increase the overall efficiency of a power production system and method.

Previous proposals have been made to optimize the performance of a power production cycle using high pressure $CO_2$ as the working fluid. For example, Bryant et al. ("An Analysis and Comparison of the Simple and Recompression Supercritical $CO_2$ Cycles" May 2011 presentation at the supercritical $CO_2$ power cycle workshop in Boulder, Colo.), the disclosure of which is incorporated herein by reference, describes Brayton cycles for power generation using recuperator heat exchanger with $CO_2$ as the working fluid. The paper defines the efficiencies of two cycles in terms of operating parameters and shows the conditions under which the second cycle gives a higher efficiency than the first, simple cycle.

Figure 1:
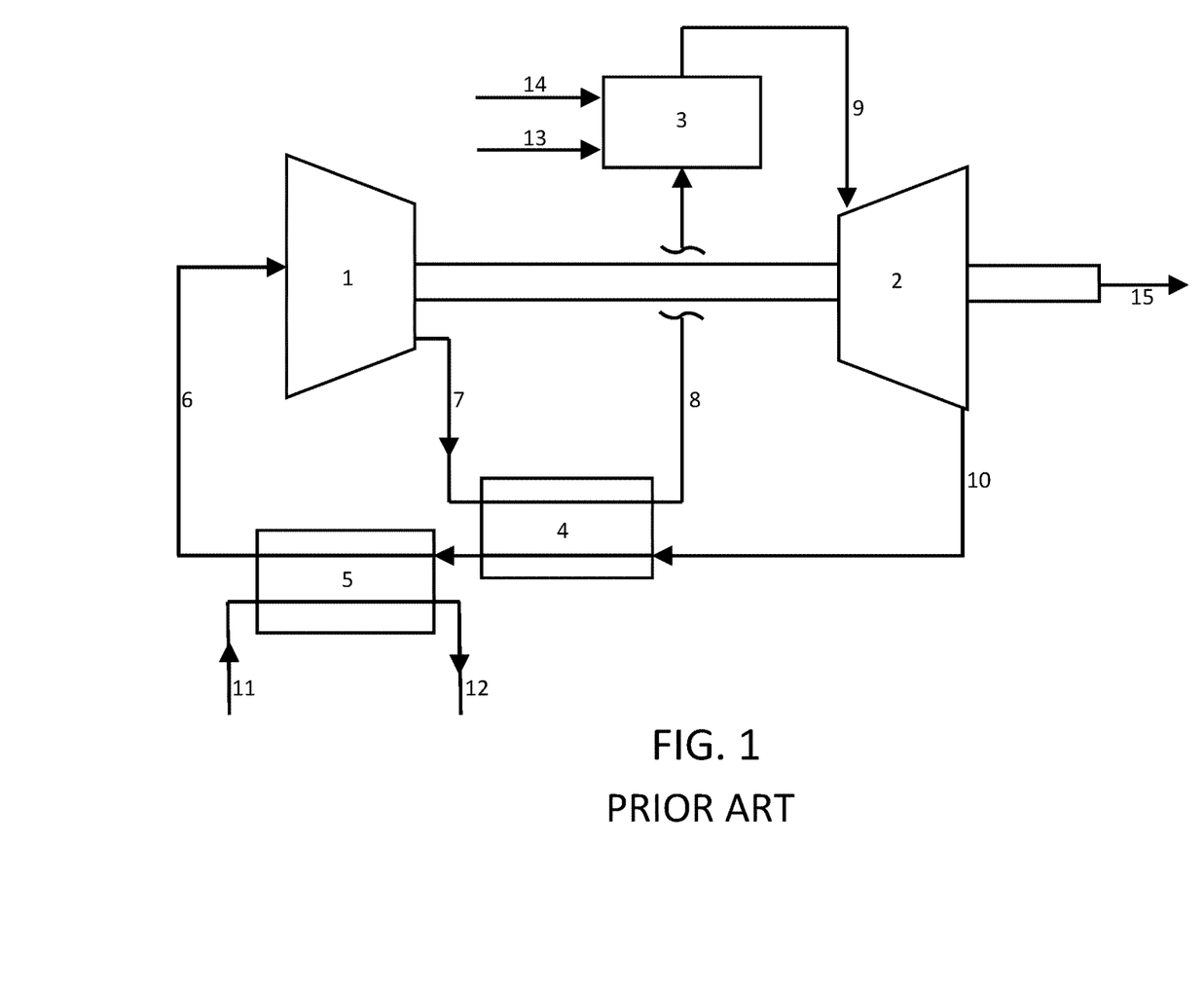
FIG. 1 is a flow diagram of a prior art power production cycle.

The first, simple cycle from Bryant et al. is shown in FIG. 1. Therein, hot $CO_2$ in line 7 that has been compressed in a near adiabatic, non-intercooled compressor 1 is further heated in a recuperator heat exchanger 4. The hot $CO_2$ then passes through line 8 to the heater 3 where it is heated either directly by combusting a fuel 14 with oxygen 13, or by some means of external heating. The further heated $CO_2$ then passes through line 9 into a power producing turbine 2 where it is expanded to a lower pressure producing shaft work (illustrated by arrow 15). The turbine exhaust stream 10 passes to the recuperator heat exchanger 4 where it cools releasing heat to the high pressure recycle stream. The turbine exhaust is then cooled in a pre-cooler 5 where heat is rejected to a cooling stream 11 that exits via line 12 before finally re-entering the compressor 1 in line 6.

Figure 2:
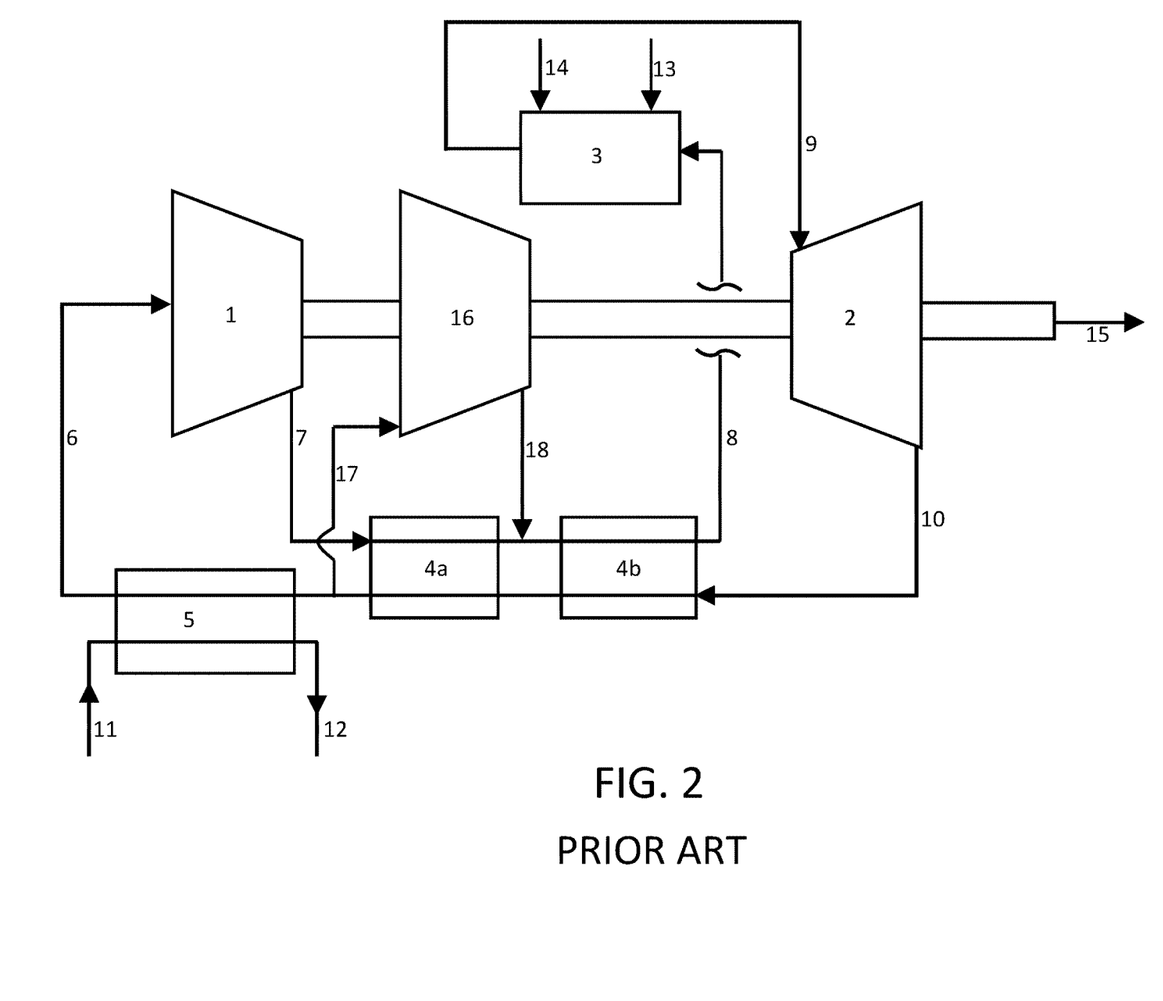
FIG. 2 is a flow diagram of a further prior art power production cycle.

The second cycle from Bryant is shown in FIG. 2, which is identical to the cycle shown in FIG. 1 apart from the addition of a second compression stage 16 in which part of the low pressure turbine exhaust stream 17 leaving the low pressure return circuit at the exit from the recuperator heat exchanger 4a before the pre-cooler 5 is compressed in its hot condition in compressor 16 leaving through line 18. This stream enters the recuperator heat exchanger 4b after mixing with the main high pressure recycle stream leaving 4a at its corresponding temperature and is heated in heat exchanger section 4b against hot turbine exhaust stream 10. The effect of the additional compression is to inject a large amount of heat into the recuperator heat exchanger from the second compressor which takes as its inlet flow a $CO_2$ stream at an elevated temperature which is greater than the inlet temperature of the main $CO_2$ compressor.

The teaching of Bryant et al. reveals a disadvantage in that the heat input by-passes the first stage of the recuperator heat exchanger 4a. The much larger specific heat of the high pressure $CO_2$ stream that is being heated in heat exchanger 4a compared to the low pressure turbine exhaust stream cooling in heat exchanger 4a means that the heat transfer in heat exchanger 4a into the high pressure stream must be maximized to achieve a close temperature approach. This is not achieved since the heated compressed $CO_2$ stream bypasses heat exchanger 4a. What is required for the maximum efficiency is to arrange a hot gas compression system in which the compressed $CO_2$ cools down in the heat exchanger and increases the available heat transfer to the high pressure $CO_2$ stream. The present disclosure relates in part to means for overcoming this disadvantage.

Although the cycles from Bryant et al. illustrated in FIG. 1 and FIG. 2 represent the known prior art for hot $CO_2$ compression, they are only suitable for use in simple Brayton cycle arrangements that use a main $CO_2$ compressor without intercoolers giving a high discharge temperature. This in turn causes the cooling turbine discharge flow leaving the recuperator heat exchanger 4a to also be at a high temperature so the heat rejected in the pre-cooler heat exchanger is also high. It is therefore apparent that optimum efficiencies will only be achieved at low pressure ratios in this hot compression cycle which are shown to be in the range of 2 to 4 with optimum main compressor inlet pressures near the critical pressure of $CO_2$. Higher pressure ratios lead to excessive heat losses in the system. The Bryant et al. cycles shown in FIG. 1 and FIG. 2 also fail to account for system details such as the presence of liquid water separation in the compressor inlet lines 6 following cooling in the heat exchanger 5 against ambient cooling means.

The Bryant et al. cycle in FIG. 2 has several further limitations. For example, the Bryant et al. cycle efficiency significantly decreases as the pressure ratio is increased since the main and recompression compressors are essentially adiabatic in operation with no intercoolers between stages. The studies reported by Bryant et al. show that the optimum pressure ratio for a turbine inlet temperature of 750° C. is 2.2 at a turbine inlet pressure of 100 bar and 3.3 at a turbine inlet pressure of 250 bar. Low pressure ratios require very high $CO_2$ flow-rates in the system for a given power output leading to high capital costs. On the contrary, the present disclosure provides cycles with high pressure ratios and high turbine inlet pressures resulting in high efficiency and low capital cost.

Systems and methods useful according to the present disclosure can utilize pressure ratios of about 5 or greater, such as about 5 to about 30. In some embodiments, pressure ratios preferably can be in the range of about 5 to about 12. The present systems and methods also can utilize intercooled main $CO_2$ recycle compression systems. The high pressure ratio favors a turbine inlet pressure above the $CO_2$ critical pressure of 7.38 MPa and a turbine discharge pressure below this pressure. These higher pressure ratios give high efficiencies of 50% to 60% for natural gas fueled systems with significantly lower circulation rates of $CO_2$ per kW of net power output. Systems and methods useful according to the present disclosure also preferably utilize a very considerable input of additive heat at a temperature level of, for example, greater than 100° C., and particularly in the range of about 100° C. to about 400° C. or about 100° C. to about 300° C. The presently disclosed systems and methods are particularly beneficial in providing for utilization of a portion of the heat of compression from the main recycle $CO_2$ compressor as this additive heating.

In some embodiments, the present disclosure provides a method of generating power. For example, the method can comprise various combinations of the following steps: passing a compressed, heated recycle $CO_2$ stream into a combustor; combusting a fuel with oxygen in a combustor in the presence of the recycle $CO_2$ stream to produce a $CO_2$ containing stream; passing the $CO_2$ containing stream through a turbine to expand the $CO_2$ containing stream, generate power, and form a turbine exhaust stream comprising $CO_2$; withdrawing heat from the turbine exhaust stream comprising $CO_2$; dividing the cooled turbine exhaust stream to form a first turbine exhaust portion and second turbine exhaust portion; separating water from the first turbine exhaust portion to form a main recycle $CO_2$ stream; compressing the main recycle $CO_2$ stream; compressing the second turbine exhaust portion adiabatically with no intercooling between compressor stages to form a heated, compressed second turbine exhaust portion; withdrawing heat from the heated, compressed second turbine exhaust portion; separating water from the cooled, compressed second turbine exhaust portion to form a secondary recycle $CO_2$ stream; combining the main recycle $CO_2$ stream and the secondary recycle $CO_2$ stream to form a total recycle $CO_2$ stream; cooling the total recycle $CO_2$ stream to form a high density $CO_2$ stream; compressing the total recycle $CO_2$ stream in a second compression stage using a fluid pump; heating the total recycle $CO_2$ stream with heat withdrawn from the turbine exhaust stream; and further heating the total recycle $CO_2$ stream with heat withdrawn from the heated, compressed second turbine exhaust portion to form the compressed, heated recycle $CO_2$ stream. In some embodiments, the two compressed $CO_2$ streams following heat withdrawal from the secondary recycle $CO_2$ stream can be combined, then the combined stream can be cooled followed by liquid water separation. In some embodiments, the second turbine exhaust stream may be compressed in multiple stages with heat transfer between one or more of the stages. For example, the second turbine exhaust stream may undergo multi-stage compression including uncooled compression stages (x) and intercooled compression stages (y), wherein x and y independent may be an integer of 1 or more, 2 or more, or 3 or more (e.g., 1 to 5 or 2 to 4). In some embodiments, the second turbine exhaust stream may be pressurized (and heated) in x uncooled compression stage(s) to an intermediate value, the pressurized gas can be utilized to provide the heat of compression to a recuperative heat exchanger so as to be cooled, the cooled gas can be dewatered, and the gas can be passed back to undergo the remaining y intercooled compression stage(s) prior to joining with the first turbine exhaust stream.

In further embodiments, the present disclosure provides a power generating system. For example, the system can comprise: a combustor; a power production turbine; one or more heat exchangers; a first cooling flow path through the one or more heat exchangers; a heating flow path through the one or more heat exchangers; a flow separator in communication with the first cooling flow path through the one or more heat exchangers; a first compressor in communication with the flow separator; a second cooling flow path through the one or more heat exchangers, the second cooling flow path being in communication with the compressor; one or more water separators; a second compressor; and a pump. In particular, the heating flow path through the one or more heat exchangers is downstream from the pump and upstream from the combustor; and the heating flow path through the one or more heat exchangers is in a heating arrangement with the first cooling flow path and the second cooling flow path through the one or more heat exchangers. In some embodiments, the first cooling flow path and the second cooling flow path can be defined by separate and independent water separation components and/or pump components. When two or more heat exchangers are used, the heat exchangers may be in series.

In some embodiments, the present disclosure can relate to a method for heating a recirculating gas stream. As an example, such method can comprise the following steps: passing a gas stream G at a pressure $P_1$ and a temperature $T_1$ through a recuperative heat exchanger such that the gas stream is cooled to a temperature $T_2$ that is less than $T_1$; separating the gas stream G into a first fraction $G_1$ and a second fraction $G_2$; compressing the gas stream fraction $G_1$ to a pressure $P_2$ that is greater than $P_1$; compressing the gas stream fraction $G_2$ to a pressure $P_3$ that is greater than $P_1$ so as to heat the gas stream fraction $G_2$ to a temperature $T_3$ that is greater than $T_2$; withdrawing the heat from the compressed gas stream fraction $G_2$; combining the gas stream fraction $G_1$ and the gas stream fraction $G_2$ to form a combined recirculating gas stream $G_C$; pumping the recirculating gas stream $G_C$ to a pressure $P_4$ that is greater than $P_2$ and greater than $P_3$; and passing the recirculating gas stream $G_C$ to the recuperative heat exchanger such that the gas stream $G_C$ is heated by the cooling gas stream G; wherein the heat withdrawn from the compressed gas stream fraction $G_2$ is added to the recirculating gas stream $G_C$ after pumping to pressure $P_4$. In further embodiments, the method for heating a recirculating gas stream may comprise any one or more of the following statements in any combination thereof.

The temperature $T_3$ can be about 100° C. to about 400° C.

The pressure $P_2$ of gas stream fraction $G_1$ and the pressure $P_3$ of gas stream fraction $G_2$ can each separately be about 40 bar (4 MPa) to about 100 bar (10 MPa).

The pressure $P_4$ of the recirculating gas stream $G_C$ can be about 100 bar (10 MPa) to about 500 bar (50 MPa).

The mass ratio of gas fraction $G_1$ to gas fraction $G_2$ based on the total mass of gas stream G can be about 50:50 to about 99:1, or can be about 50:50 to about 90:10, or can be about 50:50 to about 70:30 or can be about 70:30 to about 90:10.

The recirculating gas stream $G_C$ after passing through the recuperative heat exchanger and receiving the heat from the compressed gas fraction $G_2$ can have a temperature $T_4$ that is within 50° C. of $T_1$.

The gas stream fraction $G_2$ can be compressed with multi-stage compression with no intercooling.

After withdrawing heat from gas stream fraction $G_2$, the gas stream fraction $G_2$ can be further compressed before combining with gas stream fraction $G_1$.

The recuperative heat exchanger can comprise three heat exchangers or three heat exchange sections in series. In such embodiments, heat can be transferred in a first heat exchanger or heat exchange section operating in temperature range $R_1$, a second heat exchanger or heat exchange section operating in temperature range $R_2$, and a third heat exchanger or heat exchange section operating in temperature range $R_3$ with the temperature relationship of $R_1 > R_2 > R_3$.

The gas stream G can be separated between the first heat exchanger or heat exchange section and the second heat exchanger or heat exchange section.

The gas stream G can separated between the second heat exchanger or heat exchange section and the third heat exchanger or heat exchange section.

The heat withdrawn from the compressed gas stream fraction $G_2$ can be added to the recirculating gas stream $G_C$ in one or both of the third heat exchanger or heat exchange section and the second heat exchanger or heat exchange section.

The method further can comprise adding heat to the recirculating gas stream $G_C$ after pumping to pressure $P_4$. In such embodiments, the added heat can be derived from one or both of an air separation unit and a gas turbine.

The method further can comprise passing the heated recirculating gas stream $G_C$ from the recuperative heat exchanger to a combustor that combusts a fuel with oxygen to form a combustion product stream.

The gas stream G can be a turbine exhaust stream.

In some embodiments, the present disclosure further can relate to a method of generating power. As an example, the method can comprise the following steps: combusting a fuel with oxygen in the combustor in the presence of a recycle $CO_2$ stream to produce a $CO_2$ containing combustion stream; passing the $CO_2$ containing combustion stream through a turbine to expand the $CO_2$ containing combustion stream, generate power, and form a turbine exhaust stream; withdrawing heat from the turbine exhaust stream; dividing the turbine exhaust stream to form a first turbine exhaust portion and second turbine exhaust portion; separating water from the first turbine exhaust portion to form a main recycle $CO_2$ stream; compressing the main recycle $CO_2$ stream; compressing the second turbine exhaust portion to form a heated, compressed second turbine exhaust portion; withdrawing heat from the heated, compressed second turbine exhaust portion; separating water from the cooled, compressed second turbine exhaust portion to form a secondary recycle $CO_2$ stream; combining the main recycle $CO_2$ stream and the secondary recycle $CO_2$ stream to form a combined recycle $CO_2$ stream; compressing the combined recycle $CO_2$ stream; heating the combined recycle $CO_2$ stream with heat withdrawn from the turbine exhaust stream; and further heating the combined recycle $CO_2$ stream with heat withdrawn from the heated, compressed second turbine exhaust portion. In further embodiments, the method can comprise one or more of the following statements in any combination.

The $CO_2$ containing combustion stream can have a temperature of about 500° C. to about 1,700° C. and a pressure of about 100 bar (10 MPa) to about 500 bar (50 MPa).

The pressure ratio across the turbine can be about 5 to about 12.

The heat can be withdrawn from the turbine exhaust stream in a recuperative heat exchanger comprising three or more sections or comprising three or more individual heat exchangers.

Heating the combined recycle $CO_2$ stream with heat withdrawn from the turbine exhaust stream and further heating the combined recycle $CO_2$ stream with heat withdrawn from the heated, compressed second turbine exhaust portion can be carried out in the recuperative heat exchanger.

The mass ratio of the first turbine exhaust portion to the second turbine exhaust portion based on the total mass of the turbine exhaust stream can be about 50:50 to about 99:1.

The heat withdrawn from the heated, compressed second turbine exhaust portion can be in a temperature range of about 100° C. to about 400° C.

The main recycle $CO_2$ stream and the second turbine exhaust portion can be independently compressed to a pressure of about 40 bar (4 MPa) to about 100 bar (10 MPa).

The combined recycle $CO_2$ stream after heating with heat withdrawn from the turbine exhaust stream and further heating with heat withdrawn from the heated, compressed second turbine exhaust portion can have a temperature that is within 50° C. of the temperature of the turbine exhaust stream.

The second turbine exhaust portion can be compressed adiabatically with no intercooling between compressor stages.

In some embodiments, a power generating system according to the present disclosure can comprise the following: a combustor configured to exhaust a combustion stream; a power production turbine configured to receive and expand the combustion stream and form a turbine exhaust stream; a recuperative heat exchanger configured to receive the turbine exhaust stream; a flow separator configured to separate the cooled turbine exhaust stream into a first gas stream and a second gas stream; a first compressor configured to receive and compress the first gas stream; a second compressor configured to receive and compress the second gas stream; a pump configured to pressurize the first gas stream and the second gas stream in combination, the pump positioned downstream from the first compressor and the second compressor; a first flow path through the recuperative heat exchanger configured for passage of the turbine exhaust stream; a second flow path through the recuperative heat exchanger configured for passage of the pressurized first gas stream and second gas stream in combination; a third flow path through the recuperative heat exchanger configured for passage of the compressed second gas stream; wherein the first flow path and the third flow path are configured for heating the second flow path. In further embodiments, the system can include any one or more of the following statements in any combination.

The recuperative heat exchanger can comprise a series of three or more heat exchangers or a series of three or more heating sections.

The system further can comprise one or more separators configured for separating at least water from one or both of the first gas stream and the second gas stream.

The first compressor can comprise a multi-stage, intercooled compressor.

The second compressor can comprise an adiabatic, multi-stage compressor with no intercooling between compressor stages.

BRIEF DESCRIPTION OF THE FIGURES

Having thus described the disclosure in the foregoing general terms, reference will now be made to the accompanying drawings, which are not necessarily drawn to scale, and wherein:

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods that provide power generation using predominantly $CO_2$ as a working fluid. In particular, the process uses a high pressure/low pressure ratio turbine that expands a mixture of a high pressure recycle $CO_2$ stream and combustion products arising from combustion of the fuel. Any fossil fuel, particularly carbonaceous fuels, may be used. Non-limiting examples include natural gas, compressed gases, fuel gases (e.g., comprising one or more of $H_2$, CO, $CH_4$, $H_2S$, and $NH_3$) and like combustible gases. Solid fuels—e.g., coal, lignite, petroleum coke, bitumen, biomass, and the like, or viscous liquid fuels may be used as well with incorporation of necessary system elements. For example, a partial oxidation combustor can be used to convert the solid or viscous liquid fuel to a fuel gas that is substantially free of solid particles. All fuel and combustion derived impurities in an oxidized state, such as sulfur compounds, NO, $NO_2$, $CO_2$, $H_2O$, Hg, and the like can be separated from the power cycle for disposal with substantially or completely no emissions to the atmosphere. As noted previously, other fuels likewise may be utilized. Pure oxygen can be used as the oxidant in the combustion process. In some embodiments, combustion temperature may be regulated by diluting the oxygen with $CO_2$ in ratios as otherwise noted herein.

The hot turbine exhaust is used to partially preheat the high pressure recycle $CO_2$ stream. In combination with this heating, the recycle $CO_2$ stream can be further heated using additive heating that can be derived from the compression energy of a $CO_2$ compressor. The operating conditions for the $CO_2$ compressor can vary as further described herein. For example, in some embodiments, it can be useful to utilize a $CO_2$ compressor inlet temperature that is higher than normal approach to ambient cooling means. The minimum inlet temperature of the stream entering the $CO_2$ compressor, for example, can be approximately the dew point of water at the operating conditions. In some embodiments, the $CO_2$ compressor can have an inlet temperature of about 50° C. to about 250° C. Optionally other heating means providing heat at a temperature level below about 400° C. can be used in addition to the heating available from the $CO_2$ compression. Such means can include heat transferred from the air compressors of a cryogenic air separation plant operating partially or completely in the adiabatic mode without intercooling. When such heat is utilized, the air compressors preferably can be operated with pressure ratios above 2.5 in the adiabatic stages.

It has been discovered according to the present disclosure that power production efficiency can be improved through provision of additive heating as defined herein, such additive heating particularly being provided at a temperature level below about 400° C. (e.g., in the range of about 100° C. to about 400° C.). The provision of the additive heating can overcome the large difference in the specific heat of $CO_2$ at a typical high pressure turbine inlet of about 300 bar (30 MPa) and the specific heat of $CO_2$ at a typical low pressure turbine exhaust pressure of about 30 bar (3 MPa). This difference is evident in the table provided below.

| Temperature K (° C.) | $CO_2$ specific heat (kJ/kg) at 30 bar (3 MPa) | $CO_2$ specific heat (kJ/kg) at 300 bar (30 MPa) |
|---|---|---|
| 300 (26.85) | 1.18 | 1.95 |
| 350 (76.85) | 1.05 | 2.00 |
| 400 (126.85) | 1.02 | 1.90 |
| 450 (176.85) | 1.03 | 1.63 |
| 500 (226.85) | 1.06 | 1.47 |
| 600 (326.85) | 1.10 | 1.31 |
| 750 (476.85) | 1.17 | 1.23 |
| 1000 (726.85) | 1.24 | 1.28 |

A power production method according to the present disclosure particularly can comprise a series of steps that can provide for improved efficiency. The method can comprise passing a compressed, heated recycle $CO_2$ stream into a combustor. The compressed, heated recycle $CO_2$ stream can be formed as further described below. In the combustor, a fuel can be combusted with the oxidant (e.g., oxygen of at least 98% or at least 99% purity, optionally diluted with $CO_2$) in the presence of the recycle $CO_2$ stream to produce a $CO_2$ containing stream. The $CO_2$ containing stream from the combustor can have a temperature of about 500° C. or greater (e.g., about 500° C. to about 1,700° C. or about 800° C. to about 1,600° C.) and a pressure of about 100 bar (10 MPa) or greater (e.g., about 100 bar (10 MPa) to about 500 bar (50 MPa)). The $CO_2$ containing stream can be passed through a turbine to expand the $CO_2$ containing stream, generate power, and form a turbine exhaust stream comprising $CO_2$. The $CO_2$ containing stream can be expanded across the turbine at a pressure ratio of less than 12 or less than 10 (e.g., about 5 to about 12). In alternate embodiments, high pressure ratios as noted herein may be used, such as in the case of utilizing a plurality of turbines, as described in U.S. Pat. Pub. No. 2013/0213049, the disclosure of which is incorporated herein by reference in its entirety.

The turbine exhaust stream can be processed to remove combustion products and any net $CO_2$ produced by combustion of the fuel. To this end, the turbine exhaust stream can be cooled by passage through a heat exchanger. Any heat exchanger suitable for use under the temperature and pressure conditions described herein can be utilized. In some embodiments, the heat exchanger can comprise a series of at least two, at least three, or even more economizer heat exchangers. A single heat exchanger with at least two sections, at least three sections (or even more sections) can be used. For example, the heat exchanger may be described has having at least three heat exchange sections operating across different temperature ranges. Withdrawn heat from the turbine exhaust stream can be utilized for heating the recycle $CO_2$ stream as described below.

The turbine exhaust stream can be divided into two or more portions. The first portion can comprise 50% or greater, 70% or greater, or 90% or greater (but less than 100%) of the total mass flow of the turbine exhaust stream. The first turbine exhaust portion is cooled preferably at a temperature that is less than the water dew point after leaving the heat exchanger. The first turbine exhaust portion can be passed through a separator to remove water and can be further treated to remove other combustion products or impurities. The resulting stream can be described as a main recycle $CO_2$ stream, and this stream can be compressed such as in a multi-stage compressor with intercooling between the stages. Preferably, the main recycle $CO_2$ stream is compressed to a pressure of about 40 bar (4 MPa) to about 100 bar (10 MPa). In some embodiments, the main recycle $CO_2$ stream is compressed to a pressure of about 60 bar (6 MPa) to about 100 bar (10 MPa) or about 67 bar (6.7 MPa) to about 80 bat (8 MPa).

The second portion of the turbine exhaust stream can be compressed to form a heated, compressed second turbine exhaust portion. The second turbine exhaust portion can comprise the balance of the turbine exhaust not present in the first portion (e.g., 50% or less, 30% or less, or 10% or less (but greater than 0%) of the total mass flow of the turbine exhaust stream). Preferably, the second turbine exhaust portion can be withdrawn from the turbine exhaust between the second and third heat exchange sections (e.g., the second and third heat exchangers in the series moving from hot to cold—in other words, the heat exchangers working between the lowest temperature and an intermediate temperature). The second turbine exhaust portion is preferably compressed so as to achieve a temperature in the range of about 100° C. to about 400° C. and a pressure of about 40 bar (4 MPa) to about 100 bar (10 MPa). In some embodiments, the pressure can be about 60 bar (6 MPa) to about 100 bar (10 MPa) or about 67 bat (6.7 MPa) to about 80 bar (8 MPa). The second turbine exhaust portion can be re-introduced to the heat exchanger, preferably passing from the hot end of the intermediate temperature heat exchanger to the cold end of the low temperature heat exchanger. The cooled second turbine exhaust portion can be at a temperature that is below the water dew point, and the cooled stream can be passed through one or more separators to remove water and any other impurities. The remaining stream is a secondary recycle $CO_2$ stream, and it can be combined with the main recycle $CO_2$ stream. Such combining can be at a variety of points. For example, the main recycle $CO_2$ stream can be added to the cooled second portion of the turbine exhaust after passage through the low temperature heat exchanger and before passage through the separator. Alternatively, the main recycle $CO_2$ stream and the secondary recycle $CO_2$ stream can be combined after water separation or at another point of the cycle. Net $CO_2$ produced from combustion can be withdrawn at this point, such as for use in enhanced oil recovery, for sequestration, or the like.

In some embodiments, the second turbine exhaust portion can be compressed using multi-stage compression wherein there is no inter-cooling between stages followed by inter-cooling between later stages. Compressed and heated gas of the second turbine exhaust portion exiting the non-cooled stages can be introduced to the heat exchanger as otherwise described above, and the so-cooled stream can be subjected to the inter-cooled compression before combining with the first turbine exhaust portion. The number of non-cooled stages (x) and inter-cooled stages (y) can independently be 1 or more, 2 or more, or 3 or more (e.g., 1 to 5 or 2 to 4).

The total recycle $CO_2$ stream (formed of the main recycle $CO_2$ stream and the secondary recycle $CO_2$ stream) can be pumped to a pressure suitable for passage into the combustor. Preferably, the total recycle $CO_2$ stream is pumped to a pressure of at 100 bar (10 MPa) or greater or about 200 bar (20 MPa) or greater, such as about 100 bar (10 MPa) to about 500 bar (50 MPa). The compressed recycle $CO_2$ stream is then passed back through the heat exchangers to be heated. The compressed recycle $CO_2$ stream is heated using the heat withdrawn from the turbine exhaust stream (which can be characterized as the heat of combustion that remains in the turbine exhaust stream). The heat in the turbine exhaust stream, however, is insufficient to achieve a close temperature approach between the turbine exhaust stream and the heated, compressed recycle $CO_2$ stream at the hot end of the heat exchanger. According to the present disclosure, the heat from the compressed, second turbine exhaust portion can be used as additive heating to reduce the temperature differential between the turbine exhaust stream and the heated, compressed recycle $CO_2$ stream leaving the heat exchanger and entering the combustor. The additive heating can be characterized as the heat of recompression and is separate from the heat of combustion that is present in the turbine exhaust. The use of the additive heating can be beneficial to reduce temperature differential between the turbine exhaust stream and the heated, compressed recycle $CO_2$ stream leaving the heat exchanger and entering the combustor to about 50° C. or less, about 40° C. or less, or about 30° C. or less, such as about 10° C. to about 50° C., or about 20° C. to about 40° C.

In some embodiments, additive heating can be provided by other means in combination with or as an alternative to the heat of recompression. For example, heated $CO_2$ from an external source can be utilized. Such external source can be, for example, $CO_2$ withdrawn from a geological source, $CO_2$ taken from a pipeline, or the like. In such embodiments, splitting of the turbine exhaust stream can be unnecessary, and the heated $CO_2$ can be input to the system in the same manner as the heat of recompression described above. The additional $CO_2$ can be withdrawn from the system with the net $CO_2$ product and can be returned to the heat source. In such manner, a recycled $CO_2$ from an external source completely outside of the power production system can be utilized as additive heating. Alternatively, part or all of the additive heating can be from a gas turbine exhaust or from a condensing stream.

Figure 3:
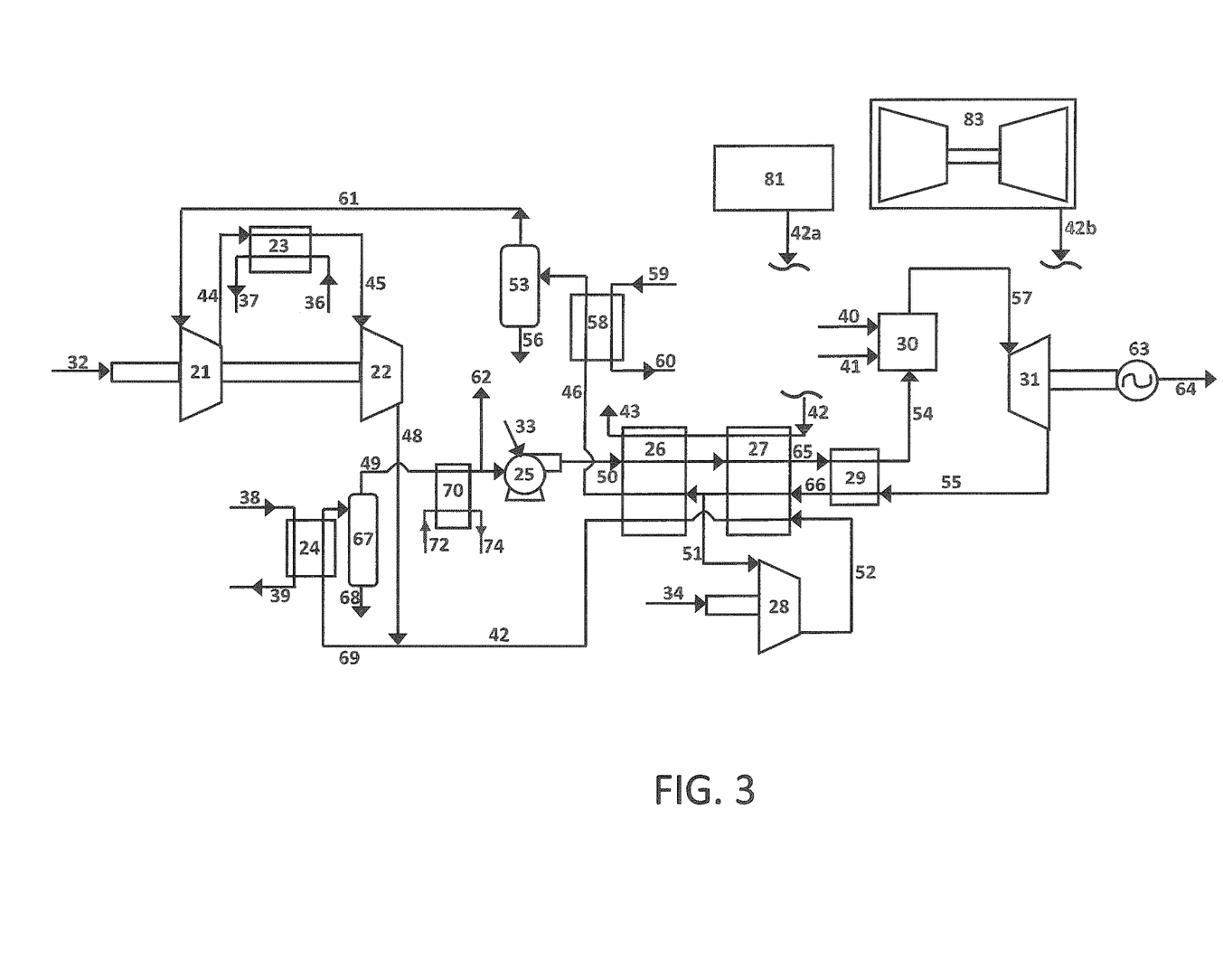
FIG. 3 is a flow diagram of a power production system and method according to an exemplary embodiment of the present disclosure including a plurality of compressors for compressing a recycle $CO_2$ stream and deriving heat therefrom for input to a recuperator heat exchanger.

An exemplary embodiment of a system according to the present disclosure is shown in FIG. 3. The embodiment is described in relation to an exemplary embodiment of a combustion method utilizing defined parameters. Specific temperatures and pressures thus can vary based upon the specific operation conditions.

In the embodiment of FIG. 3, a turbine exhaust stream 55 at 728° C. and 30 bar (3 MPa) passes through three economizer heat exchangers in series 29, 27, and 26 leaving as stream 46 at 46° C. and 29 bar (2.9 MPa). Heat exchanger 29 may be characterized as a high temperature heat exchanger, heat exchanger 27 may be characterized as an intermediate temperature heat exchanger, and heat exchanger 26 may be characterized as a low temperature heat exchanger. It is understood that the terms "high temperature," "intermediate temperature," and "low temperature," are intended to only describe the operating temperature ranges of the three heat exchangers relative to one another. The stream 46 is cooled in a water cooled heat exchanger 58 to 17.2° C., and a condensed water stream 56 is separated in the phase separator vessel 53. An overhead $CO_2$ gas stream 61 leaves the phase separator vessel 53 and enters a two stage centrifugal $CO_2$ recycle compressor 21 (stage 1) and 22 (stage 2), wherein a discharge stream 44 from the first stage compressor 21 is cooled in an intercooler 23 to 17.2° C., exits as stream 45, and is then compressed in the second stage compressor 22 to form stream 48 at 80 bar (8 MPa). This main recycle compressor discharge stream 48 joins with stream 47, and the combined stream 69 is cooled in a water cooled heat exchanger 24 to a temperature of 22.7° C. In other embodiments, this temperature can be in the range of 10° C. to about 30° C. Condensed water 68 is separated in a phase separator 67 producing the total recycle $CO_2$ stream 49, which is in the supercritical state and has a high density of 850 Kg/m³. A net product $CO_2$ stream 62, equivalent to the carbon in the fuel gas converted to $CO_2$ in the combustor, is removed from the system (after cooling, as illustrated, or before cooling) for sequestration, use in enhanced oil recovery, or the like.

The total recycle $CO_2$ stream 49 is cooled in heat exchanger 70 to a temperature of 17.2° C. then enters a multi-stage centrifugal pump 25 with a discharge pressure of 305 bar (30.5 MPa) to from a high pressure $CO_2$ recycle stream 50, which is heated in the three economizer heat exchangers in series 26, 27 and 29 leaving as stream 54 at a temperature of 725° C. and 302 bar (30.2 MPa). The stream 54 is heated to 1154° C. in combustor 30 by the direct combustion of a natural gas stream 40 with a 99.5% $O_2$ stream 41, both at 320 bar (32 MPa). In the exemplified embodiment, modeling was done with pure $CH_4$ as the fuel gas. The mixed stream of recycle $CO_2$ and combustion products 57 enters a power turbine 31 with a discharge pressure of 30 bar (3 MPa) and exits as turbine exhaust stream 55.

As seen in the table above, the difference in the specific heat of $CO_2$ at 300 bar (30 MPa) and 30 bar (3 MPa) increases as the temperature drops from 1000 K (727° C.). In light of this difference, additive heating is required to achieve a very close temperature approach between the turbine exhaust stream 55 and the recycle $CO_2$ stream 54, and such additive heating can be supplied, for example, in the "low temperature" economizer heat exchanger 26 and/or the "intermediate temperature" economizer heat exchanger 27. According to the present disclosure, the additive heating can be provided by utilizing the adiabatic heat of compression of part of the recycle $CO_2$ stream which, in the exemplary embodiment, is compressed to a pressure of about 29 bar (2.9 MPa) to about 80 bar (8 MPa).

Returning to the exemplary embodiment of FIG. 3, a portion of the cooling turbine exhaust stream 51 between the two economizer heat exchanger sections 27 and 26 at a temperature of 138° C. can be withdrawn and compressed in a single stage or multi-stage adiabatic compressor 28 producing stream 52 at 246° C. and 80 bar (8 MPa). The compressed and heated stream 52 re-enters the hot end of economizer heat exchanger 27, and the stream is passed through heat exchanger 27 and heat exchanger 26 where it cools and leaves as stream 47 at 54° C. The entire heat of compression in compressor 28 supplied by work stream 34 is thusly transferred to the high pressure recycle $CO_2$ stream, and this heat input is equivalent to heat of combustion delivered in the combustor 30 since it reduces the hot end temperature difference. The flow-rate of stream 51 is maximized to achieve a significantly small temperature difference between streams 65 and 66 at the inlet to the high temperature economizer heat exchanger 29. This temperature difference between streams 65 and 66 preferably is about 50° C. or less, about 40° C. or less, about 30° C. or less, about 20° C. or less, particularly about 10° C. to about 50° C., or about 20° C. to about 40° C. As discussed above, stream 47 joins with the main recycle compressor discharge stream 48 for cooling in heat exchanger 24 to 22.7° C. The additive heating provide by $CO_2$ compression as described above provides for increased efficiency in the power production system.

Note that other sources of low temperature level heating (e.g., gas turbine exhaust or condensing stream) can be utilized as the additive heating. The exemplary embodiment of FIG. 3 includes the cryogenic air separation plant 81 main air flow 42a which has been adiabatically compressed to 5.7 bar (0.57 MPa) and 223° C. entering the hot end of economizer heat exchanger 27 as stream 42 and leaving heat exchanger 26 as stream 43 at 54° C. In some embodiments, stream 42 may arise from stream 42b, which is illustrated as heat derived from a gas turbine 83. Although not illustrated in FIG. 3, in some embodiments, the $O_2$ stream can be supplied from the air separation plant at 80 bar (8 MPa) and ambient temperature and can be mixed with $CO_2$ from stream 49 to give 25 mol % $O_2$ that can be compressed to 320 bar (32 MPa) before being heated to 725° C. in the economizer heat exchangers 27, 26 and 29. In practice, this $CO_2+O_2$ compressor can also feature a hot gas compressor section as has been shown for the $CO_2$ recycle compressor. In FIG. 3, cooling water inlet streams are represented as streams 38, 59, 72, and 36, while the respective outlet streams are represented as streams 39, 60, 74, and 37. The compressor power inputs are illustrated in FIG. 3 as elements 32 and 34, and such power inputs may be electric or may be turbine driven. The $CO_2$ pump electric power input is illustrated as element 33. The turbine shaft power output is illustrated as element 64 from the generator 63.

The exemplary embodiment described was evaluated with ASPEN modeling software using actual machine efficiencies, heat exchanger temperature differences, and system pressure drops giving a net efficiency of 58.5% (LHV basis). The calculation was based on a thermal input of 500 MW to the combustor 30.

Although the disclosed systems and methods may be particularly applicable to combustion systems and methods for power production, a broader application to efficient heating of a gas stream is also encompassed. As such, in some embodiments, the present disclosure can relate to a method for heating a gas stream, and particularly for heating a recirculating gas stream. The recirculating gas stream may be any gas stream that is continuously cycle through stages of heating and cooling, optionally including stages of compression and expansion.

A gas stream G that may be subject to heating according to the present disclosure may be any gas; however, it can be particularly advantageous for the gas stream G to comprise $CO_2$, such as being at least about 10%, at least about 25%, at least about 50%, at least about 75%, or at least about 90% by mass $CO_2$. A recirculating gas stream G particularly may be at increased temperature $T_1$ (e.g., about 500° C. to about 1700° C.) and a pressure $P_1$ that enables forming a desired amount of heat of compression—e.g., a pressure of less than about 40 bar (4 MPa). The gas stream G at pressure $P_1$ and temperature $T_1$ can be cooled, such as by passage through a recuperative heat exchanger. Preferably, cooling is such that the gas stream G is cooled to a temperature $T_2$ that is less than $T_1$. In some embodiments, cooling can be carried out using a series of multiple heat exchangers (e.g., 2, 3, or more heat exchangers) or using a heat exchanger that includes a plurality of heat exchange sections or using a combination thereof. The individual heat exchangers (or heat exchange sections) can exchange heat at different temperature ranges, which ranges may overlap. Use of multiple heat exchangers and/or heat exchange sections enables streams to be added or withdrawn at different temperature ranges.

The gas stream G can be separated into a first fraction $G_1$ and a second fraction $G_2$. Such separation can occur after the gas stream G has been cooled to the temperature $T_2$ or to an intermediate temperature $T_{int}$ that is between $T_1$ and $T_2$. The temperature $T_2$, for example, can be the temperature at the cold end of the recuperative heat exchanger (or the heat exchanger or heat exchange section working over the lowest temperature range), and the temperature $T_{int}$, for example, can be a temperature at the cold end of a second heat exchanger (or second heat exchange section) in a series of three or more heat exchangers (or heat exchange sections). Preferably, the second gas fraction $G_2$ can be withdrawn at an intermediate temperature prior to further cooling of the first gas fraction $G_1$. After the gas stream fraction $G_1$ has been cooled, it can then be compressed to a greater pressure $P_2$ that preferably can be greater than $P_1$. Such compression, for example, can be carried out with a multi-stage compressor that is intercooled. The pressure $P_3$ can be, for example, about 40 bar (4 MPa) to about 100 bar (10 MPa), about 60 bar (6 MPa) to about 100 bar (10 MPa) or about 67 bar (6.7 MPa) to about 80 bat (8 MPa).

The withdrawn gas stream fraction $G_2$ can be separately compressed to a pressure $P_3$ that also preferably is greater than $P_1$. The pressure $P_3$ can be in the same range of pressure $P_2$; however, $P_2$ and $P_3$ do not necessarily need to be identical. In some embodiments, the gas stream fraction $G_2$ can be compressed using adiabatic compression with no intercooling so as to heat the gas stream fraction $G_2$ to a temperature $T_3$ that is greater than $T_2$. In embodiments wherein the gas stream fraction $G_2$ can be withdrawn at the intermediate temperature $T_{int}$, $T_3$ preferably is greater than $T_{int}$. The heat from the compressed gas stream fraction $G_2$ can be withdrawn and used as additive heating to the recirculating gas stream as further described below.

After the compression heat has been withdrawn from gas stream fraction $G_2$, the gas stream fraction $G_1$ and the gas stream fraction $G_2$ can be combined to form a combined recirculating gas stream $G_C$. The recirculating gas stream $G_C$ will have a pressure that is substantially similar to the pressure $P_2$ and/or $P_3$ and can be pumped to a greater pressure $P_4$ that is greater than $P_2$ and greater than $P_3$. Such pumping is desirable is the recirculating gas stream $G_C$ is being utilized in a high pressure application. In some embodiments, however, the pressure $P_2$ and/or $P_3$ may be suitable and no further compression may be required.

The recirculating gas stream $G_C$ (optionally at the pressure $P_4$) can be passed to the recuperative heat exchanger such that the gas stream $G_C$ is heated by the cooling gas stream G. The heat withdrawn from the compressed gas stream fraction $G_2$ can be added to the recirculating gas stream $G_C$. Such additive heating can be carried out after pumping to pressure $P_4$. In some embodiments, the additive heating can be carried out in the recuperative heat exchanger. For example, if a single recuperative heat exchanger is used, the heat of compressed gas stream fraction $G_2$ can be input to the heat exchanger at a suitable point to provide the additive heating to the recirculating gas stream $G_C$ in the desired temperature range. In embodiments wherein a plurality of heat exchanger (or heat exchange sections) are used, the heat of compressed gas stream fraction $G_2$ can be added to one or more of the lower temperature heat exchangers (or heat exchange sections). For example, during compression, gas stream fraction $G_2$ can be heated to a temperature in the range of about 100° C. to about 400° C., and the heat from the compressed gas stream fraction $G_2$ can be added to one or more heat exchangers (or heat exchange sections) working in this temperature range. In FIG. 3, for example, compressed gas stream fraction $G_2$ would equate to stream 52, which is passed through heat exchangers 26 and 27, which are working at a lower temperature range than heat exchanger 29. Generally, a series of heat exchangers such as illustrated in FIG. 3, comprises three heat exchangers that each transfer in separate temperature ranges (which ranges may overlap). In the example of FIG. 3, heat exchanger 29 can be characterized as operating in a temperature range $R_1$, heat exchanger 27 can be characterized as operating in a temperature range $R_2$, and heat exchanger 26 can be characterized as operating in a temperature range $R_3$. As illustrated, since heat exchanger 29 is at the hot end of the series and heat exchanger 26 is at the cold end of the series, the temperature relationship of the series of heat exchangers would be $R_1 > R_2 > R_3$.

The use of the additive heating provided by the compression heat in compressed gas stream fraction $G_2$ can be beneficial to bring the temperature of the combined recirculating gas stream $G_C$ significantly close to the temperature of gas stream G prior to cooling. For example, the recirculating gas stream $G_C$ after passing through the recuperative heat exchanger and receiving the heat from the compressed gas fraction $G_2$ can have a temperature $T_4$ that is within 50° C. of $T_1$. Typically, the temperature $T_4$ of recirculating gas stream $G_C$ after passing through the recuperative heat exchanger will remain below $T_1$. In such embodiments, recirculating gas stream $G_C$ after passing through the recuperative heat exchanger and receiving the heat from the compressed gas fraction $G_2$ can have a temperature $T_4$ that is less than $T_1$ by no more than 50° C.

The approach of T4 to T1 can be further improved through addition of heat from one or more additional sources. Such additional heat source can comprise any device or combination of devices configured to impart heating to a stream that is sufficient to heat a gas stream as described herein so that the gas stream achieves the desired quality and quantity of heat. As non-limiting examples, the additional heat source can be one or more of a combustion heat source, a solar heat source, a nuclear heat source, a geothermal heat source, and an industrial waste heat source. The additional heat source may include a heat exchanger, a heat pump, a power producing device, and any further combination of elements (e.g., piping and the like) suitable to form, provide, or deliver the necessary heat.

The method for heating a recirculating gas stream can further comprise one or more steps. For example, the gas stream G may be a stream exiting a turbine. As such, the pressure $P_1$ of gas stream G can be less than an earlier pressure $P_0$ of the gas stream before passage through the turbine. In some embodiments, $P_0$ can be substantially similar to $P_4$ (e.g., within 10%, within 5%, or within 2% thereof). In some embodiments, recirculating gas stream $G_C$ can be subjected to a superheating step after exiting the hot end of the heat exchanger (i.e., after being re-heated in the heat exchanger and receiving the additive heat of compression from $G_2$). For example, recirculating gas stream $G_C$ can be heated with heat of combustion, with solar heating, with nuclear heating, with geothermal heating, with industrial waste heating, or with any combination thereof. In some embodiments, recirculating gas stream $G_C$ can be so-heated and then passed through a turbine for expansion and power production. The stream leaving the turbine may then be characterized again as gas stream G.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for heating a recirculating gas stream comprising:
    passing a heated exhaust gas stream through a recuperative heat exchanger to withdraw heat therefrom and form a cooled gas stream;
    separating the cooled gas stream into at least a first fraction and a second fraction;
    compressing the first fraction of the cooled gas stream to form a compressed first fraction gas stream;
    compressing the second fraction of the gas stream so as to add heat to the second fraction of the gas stream and form a compressed second fraction gas stream;
    combining the compressed first fraction gas stream and the compressed second fraction gas stream to form a combined recirculating gas stream; and
    pumping the combined recirculating gas stream to a pressure that is greater than a pressure of the compressed first fraction gas stream and greater than a pressure of the compressed second fraction gas stream;
    wherein the combined recirculating gas stream is heated using the heat withdrawn from the heated exhaust gas stream and the heat added to the second fraction of the gas stream.

2. The method according to claim 1, wherein heat is added to the second fraction of the gas stream so that the compressed second fraction gas stream is at a temperature of 100° C. to 400° C.

3. The method according to claim 1, wherein the combined recirculating gas stream is pumped to a pressure of 100 bar (10 MPa) to 500 bar (50 MPa).

4. The method according to claim 1, wherein compressing the second fraction of the gas stream comprises multi-stage compression with no intercooling.

5. The method according to claim 1, comprising withdrawing the heat that was added to the second fraction of the gas stream fraction and providing said heat to the combined recirculating gas stream after said pumping.

6. The method according to claim 1, wherein the recuperative heat exchanger comprises at least two heat exchangers or at least two heat exchange sections in series.

7. The method according to claim 1, further comprising adding heat to the combined recirculating gas stream after said pumping, wherein the heat added to the combined recirculating gas stream is derived from one or both of an air separation unit and a gas turbine.

8. The method according to claim 1, wherein after heating the combined recirculating gas stream using the heat withdrawn from the heated exhaust gas stream and the heat added to the second fraction of the gas stream, the method further comprises passing the combined recirculating gas stream to a combustor that combusts a fuel with oxygen to form a combustion product stream.

9. A method of generating power, the method comprising:
    expanding a compressed $CO_2$ containing stream through a turbine to expand the compressed $CO_2$ containing stream, generate power, and form a turbine exhaust stream;
    withdrawing heat from the turbine exhaust stream;
    dividing the turbine exhaust stream to form a first turbine exhaust portion and second turbine exhaust portion;
    compressing the first turbine exhaust portion to form a main recycle $CO_2$ stream;
    compressing the second turbine exhaust portion to add heat thereto and form a secondary recycle $CO_2$ stream;
    combining the main recycle $CO_2$ stream and the secondary recycle $CO_2$ stream to form a combined recycle $CO_2$ stream; and
    compressing the combined recycle $CO_2$ stream;
    wherein the combined recycle $CO_2$ stream is heated using the heat withdrawn from the turbine exhaust stream and the heat added to the second turbine exhaust portion.

10. The method according to claim 9, wherein the $CO_2$ containing stream has a temperature of 500° C. to 1,700° C. and a pressure of 100 bar (10 MPa) to 500 bar (50 MPa).

11. The method according to claim 9, wherein a pressure ratio across the turbine is about 5 to 12.

12. The method according to claim 9, wherein the heat from the turbine exhaust stream is withdrawn in a recuperative heat exchanger.

13. The method according to claim 9, wherein the secondary recycle $CO_2$ stream when being combined with the main recycle $CO_2$ stream is at a temperature of 100° C. to 400° C.

14. The method according to claim 9, wherein compressing the second turbine exhaust portion comprises multi-stage compression with no intercooling between compressor stages.

* * * * *